(12) United States Patent
Moore et al.

(10) Patent No.: US 9,090,117 B2
(45) Date of Patent: Jul. 28, 2015

(54) DECORATIVE PANELS WITH RECESSED PATTERNS AND METHODS OF MAKING THE SAME WITH A FLEXIBLE DIE

(75) Inventors: Charles H. Moore, Salt Lake City, UT (US); Matthew T. Sutton, Salt Lake City, UT (US); John E. C. Willham, Sandy, UT (US); M. Hoyst Brewster, Salt Lake City, UT (US)

(73) Assignee: 3form, LLC, Salt Lake City, UT (US)

( * ) Notice: Subject to any disclaimer, the term of this patent is extended or adjusted under 35 U.S.C. 154(b) by 0 days.

(21) Appl. No.: 14/346,303

(22) PCT Filed: Feb. 22, 2012

(86) PCT No.: PCT/US2012/026157
§ 371 (c)(1),
(2), (4) Date: Mar. 20, 2014

(87) PCT Pub. No.: WO2013/066381
PCT Pub. Date: May 10, 2013

(65) Prior Publication Data
US 2014/0272294 A1    Sep. 18, 2014

Related U.S. Application Data

(63) Continuation of application No. 29/400,722, filed on Aug. 31, 2011, now Pat. No. Des. 654,190, which is a continuation of application No. 29/400,724, filed on Aug. 31, 2011, now Pat. No. Des. 653,778, which is a
(Continued)

(51) Int. Cl.
*B29C 43/10*    (2006.01)
*B44C 5/04*    (2006.01)
*B44C 1/24*    (2006.01)
*B29L 31/00*    (2006.01)
(Continued)

(52) U.S. Cl.
CPC . *B44C 5/04* (2013.01); *B29C 43/10* (2013.01); *B44C 1/24* (2013.01); *B29C 43/021* (2013.01); *B29C 2043/3652* (2013.01); *B29L 2031/7232* (2013.01); *B29L 2031/776* (2013.01); *Y10T 428/24355* (2015.01)

(58) Field of Classification Search
None
See application file for complete search history.

(56) References Cited

U.S. PATENT DOCUMENTS

| | | |
|---|---|---|
| 3,593,474 A | 7/1971 | Neels |
| 4,290,248 A | 9/1981 | Kemerer |
| 5,437,753 A | 8/1995 | Ugolini |

(Continued)

FOREIGN PATENT DOCUMENTS

| | | |
|---|---|---|
| EP | 2343185 | 7/2011 |
| JP | 06-297572 | 10/1994 |

OTHER PUBLICATIONS

International Search Report and Opinion, PCT/US2012/026157, Mailed May 30, 2013.
(Continued)

*Primary Examiner* — Monica Huson
(74) *Attorney, Agent, or Firm* — Workman Nydegger

(57) ABSTRACT

Implementations of the present invention relate to decorative thermoplastic resin panels, which can include one or more recesses. The recess of the thermoplastic resin panels can have texture or texture patterns that differ from the texture or texture patterns of non-recessed portions or other recesses of the decorative thermoplastic resin panel. Additionally, the present invention relates to a method for forming recesses in thermoplastic panels with a flexible die.

21 Claims, 7 Drawing Sheets

Related U.S. Application Data continuation of application No. 29/400,721, filed on Aug. 31, 2011, now Pat. No. Des. 653,777, which is a continuation of application No. 29/400,726, filed on Aug. 31, 2011, now Pat. No. Des. 653,779, which is a continuation of application No. 29/400,727, filed on Aug. 31, 2011, now Pat. No. Des. 653,360, which is a continuation of application No. 29/400,729, filed on Aug. 31, 2011, now Pat. No. Des. 653,780.

(51) Int. Cl.
*B29C 43/02* (2006.01)
*B29C 43/36* (2006.01)

(56) References Cited

U.S. PATENT DOCUMENTS

| | | | |
|---|---|---|---|
| 5,554,331 A * | 9/1996 | Kildune | 264/161 |
| 5,639,329 A | 6/1997 | Van Ert | |
| 5,987,831 A | 11/1999 | Lambert | |
| 6,099,771 A * | 8/2000 | Hudkins et al. | 264/102 |
| 6,533,986 B1 * | 3/2003 | Fosaaen et al. | 264/314 |
| D569,012 S | 5/2008 | Ellis | |
| 7,833,458 B2 * | 11/2010 | Yuzawa et al. | 264/293 |
| 7,913,459 B2 | 3/2011 | Ball | |
| D653,360 S | 1/2012 | Martin | |
| D653,777 S | 2/2012 | Damen | |
| D653,778 S | 2/2012 | Martin | |
| D653,779 S | 2/2012 | Damen | |
| D653,780 S | 2/2012 | Metcalf | |
| D654,190 S | 2/2012 | Martin | |

OTHER PUBLICATIONS

International Preliminary Report on Patentability for PCT/US2012/026157, Mailed Mar. 4, 2014.

* cited by examiner

DECORATIVE PANELS WITH RECESSED PATTERNS AND METHODS OF MAKING THE SAME WITH A FLEXIBLE DIE

CROSS-REFERENCE TO RELATED APPLICATIONS

The present invention is a 35 U.S.C. §371 U.S. National Stage of PCT Application No. PCT/US12/26157 entitled "Decorative Panels with Recessed Patterns and Methods of Making the Same with Flexible Die," filed Feb. 22, 2012, which claims the benefit of and priority to the following: U.S. Design patent application Ser. No. 29/400,722, filed Aug. 31, 2011, entitled "Panel Having A Spray Surface Texture;" U.S. Design patent application Ser. No. 29/400,724, filed Aug. 31, 2011, entitled "Panel Having A Meadow Surface Texture;" U.S. Design patent application Ser. No. 29/400,721, filed Aug. 31, 2011, entitled "Panel Having A Straight Up Surface Texture;" U.S. patent Design application Ser. No. 29/400, 726, filed Aug. 31, 2011, entitled "Panel Having A Flow Surface Texture;" U.S. Design patent application Ser. No. 29/400,727, filed Aug. 31, 2011 entitled "Panel Having A Spotted Surface Texture;" and U.S. Design patent application Ser. No. 29/400,729, filed Aug. 31, 2011 entitled "Panel Having A Rule Surface Texture." The entire contents of each of the foregoing patent applications are incorporated by reference herein.

BACKGROUND OF THE INVENTION

1. The Field of the Invention

This invention relates to methods for making decorative thermoplastic panels with a flexible die, as well as decorative panels formed by such methods.

2. Background and Relevant Art

Recent trends in building design involve using one or more sets of decorative panels to add to the functional and/or aesthetic characteristics of a given structure of design space. For instance, some recent architectural designs have implemented synthetic thermoplastic polymeric resin panels for use as partitions, displays, barriers, lighting diffusers, decorative finishes, etc. Polymeric resin panel materials may include, for example, poly vinyl chloride (PVC); polyacrylate materials such as poly (methyl methacrylate) (PMMA); polyester materials such as poly (ethylene-co-cyclohexane 1,4-dimethanol terephthalate) (PET) or poly (ethylene-co-cyclohexane 1,4-dimethanol terephthalate glycol) (PETG); glycol modified polycyclohexylenedimethlene terephthalate (PCTG); 1,4-cyclohexanedimethanol (CHDM); polycarbonate (PC) materials, and the like. Materials used in producing polymeric resin panels may also include any number of similar resins or resin alloys that trace their component origins to derivatives of petroleum processing.

Resin panels are popular compared with decorative cast or laminated glass panels, since resin panels are generally more resilient and have a lower specific gravity than glass panels, while having a similar transparent, translucent, or decorative appearance. Decorative resin panels may also provide greater design flexibility as compared with glass panels, at least in terms of color choices, degree of texture, thickness, and overall physical characteristics, such as flexibility and impact resistance. Furthermore, decorative resin panels have wide utility since manufacturers can easily and inexpensively form and fabricate single or multi-layer laminate resin panels that include a large variety of artistic designs, images, shapes, structures, and assemblies. Manufacturers can economically produce resin panels as either flat sheets or three-dimensional (i.e., curved or shaped) formations, that can potentially include compound curvatures. As a result, resin panels have a fairly wide functional and aesthetic utility, and provide designers and architects with the ability to readily change the design and function of new and existing structures.

Decorative thermoplastic panels can include various decorative features. In some instances, decorative thermoplastic panels may include an embossed design or a pattern thereon. Conventional methods for manufacturing decorative thermoplastic panels with embossments, depressions, or recesses typically require depositing a releasing agent between the thermoplastic resin sheet and a tool or mold. Frequently, the manufacturing methods provide for placing a sheet of release film between the tool and a thermoplastic resin sheet. The release film can prevent the thermoplastic resin sheet from binding to the tool and can facilitate a clean release of the finished decorative thermoplastic panel after the manufacturing process is complete. The use of a releasing agent, however, also can cause the entire sheet (i.e., the recessed portions and the non-recessed portions) to have the same sheen or gloss level as the release agent.

In addition to the foregoing, conventional methods for forming embossed panels are often time consuming and/or otherwise expensive. For example, conventional processing typically requires preheating of the resin panel to avoid cracking, or otherwise, damaging the panel or tool or mold during processing. Furthermore, conventional molds with intricate or complex designs are expensive.

BRIEF SUMMARY OF THE INVENTION

Implementations of the present invention solve one or more of the foregoing or other problems in the art with systems, methods, and apparatus for making decorative thermoplastic panels with a flexible die to create that a plurality of recesses in the panels. Such methods can provide great flexibility in design of the recesses. Furthermore, the use of flexible dies can reduce manufacturing time, and improve panel manufacturing yields. In one or more implementations, the recesses can have texture patterns and/or surface roughness dissimilar to the texture patterns and/or surface roughness of non-recessed surfaces of the decorative thermoplastic panel. The difference between the texture patterns and/or surface roughness of the non-recessed and recessed surfaces can enhance the aesthetic effect and/or distinctiveness of the recesses.

For example, one implementation of a method of making a decorative thermoplastic panel involves preparing panel assembly comprising a thermoplastic resin sheet and a flexible die. The flexible die includes a plurality of flexible protrusions extending from a front surface. The method also involves pressing the flexible die and the thermoplastic resin sheet together such that one or more flexible protrusions of the plurality of flexible protrusions are in contact with a surface of the thermoplastic resin sheet. Furthermore, the method involves applying heat to one or more of the flexible die and thermoplastic resin sheet to cause resin of the thermoplastic resin sheet to flow about the flexible protrusions thereby creating a plurality of recesses extending into the surface of the thermoplastic resin sheet.

Additionally, an implementation of a decorative thermoplastic panel product is prepared by method involving providing a thermoplastic resin sheet and providing a flexible die that has a plurality of flexible protrusions. The method also involves pressing the plurality of flexible protrusions against the thermoplastic resin sheet. The method further involves applying heat to the thermoplastic resin sheet such that resin of the thermoplastic resin sheet at least partially flows about the flexible protrusions to create a plurality of recesses extending into the surface of the thermoplastic resin sheet.

In addition to the foregoing, an implementation of a decorative thermoplastic panel includes a first surface and a second surface that is opposite to the first surface. The decorative thermoplastic panel further includes a plurality of recesses extending into the first surface. Recesses of the plurality of recesses have a first texture pattern. The first surface has a second texture pattern. Additionally, the second texture pattern differs from the first texture pattern in texture and/or sheen.

Additional features and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
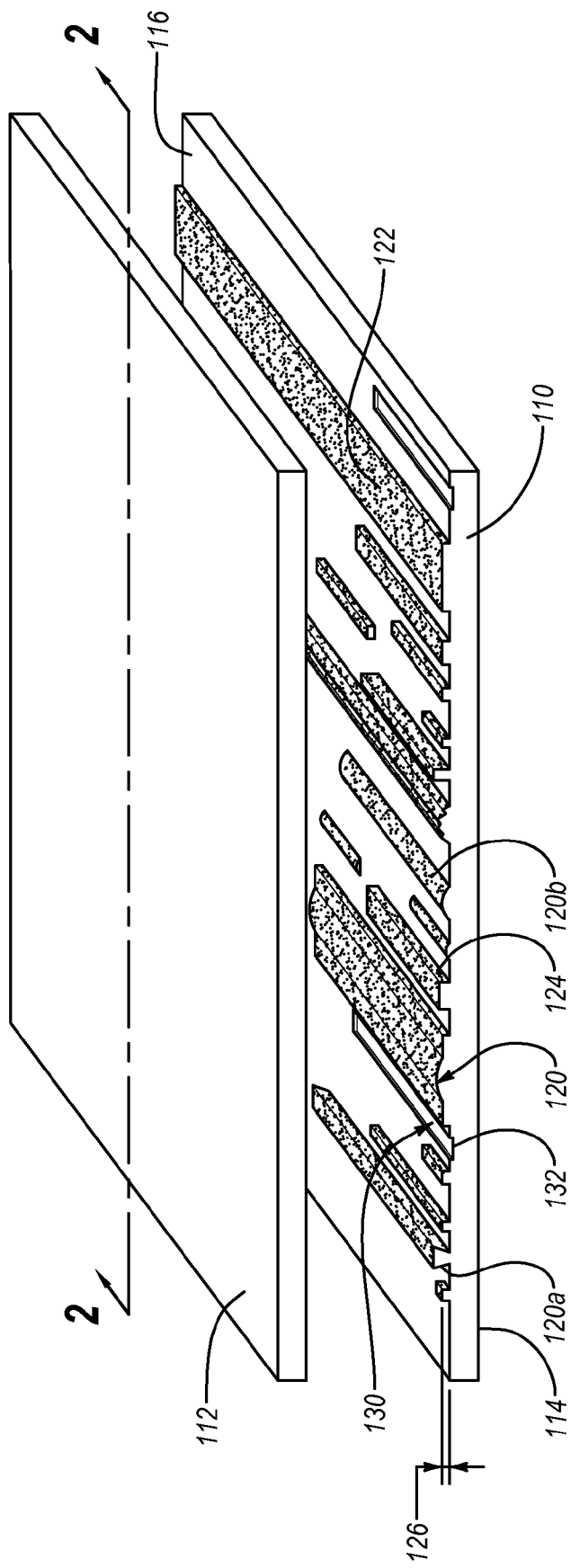
FIG. 1 illustrates a perspective view of a flexible die and a thermoplastic resin sheet in accordance with an implementation of the present invention.

Implementations of the present invention provide systems, methods, and apparatus for making decorative thermoplastic panels with a flexible die to create that a plurality of recesses in the panels. Such methods can provide great flexibility in design of the recesses. Furthermore, the use of flexible dies can reduce manufacturing time, and improve panel manufacturing yields. In one or more implementations, the recesses can have texture patterns and/or surface roughness dissimilar to the texture patterns and/or surface roughness of non-recessed surfaces of the decorative thermoplastic panel. The difference between the texture patterns and/or surface roughness of the non-recessed and recessed surfaces can enhance the aesthetic effect and/or distinctiveness of the recesses.

Unexpectedly, in at least one implementation, the flexible die, which can be substantially more flexible and softer than the thermoplastic resin sheet, can create decorative recesses in the thermoplastic resin sheet upon the application of heat and pressure. Moreover, because the flexible die is generally softer and more flexible than the thermoplastic resin sheet, the flexible die can press against the thermoplastic resin sheet without scratching or otherwise damaging the thermoplastic resin sheet before heating the thermoplastic resin sheet to the point at which the material will flow.

In one or more implementations, the flexible die can have a plurality of flexible protrusions. A device or machine can press the flexible die, and consequently the flexible protrusions, against the thermoplastic resin sheet. Heat, in combination with pressure, can soften the thermoplastic resin sheet and allow the flexible protrusions to extend into a surface of the softened thermoplastic resin sheet. Upon removal of heat as such the material can cool and re-solidify, the machine (or operator) can separate the flexible die from the thermoplastic resin sheet, thereby revealing the recesses in a finished decorative thermoplastic panel.

At least one implementation also includes pressing together the flexible die and the thermoplastic resin sheet without first preheating the thermoplastic resin sheet. That is, a manufacturer can heat the thermoplastic resin sheet after pressing together the flexible die and the thermoplastic sheet. Such implementations allow the manufacturer to reduce production time by incorporating the heating time simultaneously with the pressing time. The resulting time reduction can decrease overall manufacturing costs associated with production of the decorative thermoplastic resin panels. Additionally, at least one implementation does not require the use a release agent between the flexible die and the thermoplastic resin sheet.

Additionally or alternatively, the flexible protrusions and/or recessed portions of the flexible die can include texture patterns and/or surface roughness. In one or more implementations, the texture patterns and/or surface roughness can vary from one flexible protrusion to another, between the recessed portions, and/or between the recessed portions and the flexible protrusions. Furthermore, the flexible die can transfer the texture patterns and/or surface roughness to the thermoplastic resin sheet. Hence, the final decorative thermoplastic panel can include recesses that have different texture patterns and/or surface roughness than non-recessed areas of the same decorative thermoplastic panel.

Accordingly, in one or more implementations, decorative thermoplastic panels include recesses that extend into a surface of the panels. The recesses can have a first texture pattern, and the surface can have a second, differing pattern. In at least one implementation, the surface of the decorative thermoplastic panel can have a high gloss surface finish and/or can be substantially smooth, while the recesses have a rough texture. In one or more implementations, the difference between the surface textures of the recesses and the surface of the decorative thermoplastic panel can increase or enhance the visibility of the recesses and can improve the aesthetic appeal of the panel. Furthermore, at least some of the recesses can have a different surface texture or surface roughness than other recesses.

As described above, in at least one implementation, a flexible die can press against a thermoplastic resin sheet to create one or more recesses in a surface of the thermoplastic resin sheet. As used herein, the term "thermoplastic resin" refers to any one of the following thermoplastic polymers (or alloys or combinations thereof). Specifically, such materials can include, but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), poly lactic acid (PLA), or the like.

As alluded to above, one or more implementations can include the use of flexible die to form recesses in a thermoplastic panel. For example, FIG. 1 illustrates a flexible die 110 in accordance with an implementation of the present invention. The flexible die 110 can be substantially flexible, such that the flexible die 110 can compress, stretch, bend, and/or deform in response to applied force.

In particular, in at least one implementation the flexible die 110 can have a greater flexibility and deformability than the thermoplastic resin sheet 112. In such implementations, the flexible die 110 can deform when pressed against the solid thermoplastic resin sheet 112, leaving the thermoplastic resin sheet 112 undamaged and/or unbroken. In one or more implementations, the flexible die 110 can have sufficient flexibility as to allow the flexible die 110 to fold. For example, a manufacturer can roll, bend, or fold the flexible die 110 to facilitate compact and convenient storage when the flexible die 110 is not in use.

Additionally, the flexibility of the flexible die 110 can allow the flexible die flexible die 110 to conform to curved, deformed, or irregular surfaces. Hence, the manufacturer can use the flexible die 110 to recesses or patterns to a flat surface, a curved surface, and/or an irregularly-shaped surface. Consequently, the manufacturer can produce various thermoplastic panels with different patterns and with different surface curvatures simultaneously.

FIG. 1 further illustrates that the flexible die 110 can have a back surface 114 and a front surface 116. The flexible die 110 also can include one or more die protrusions 120, which can protrude away from the front surface 116. The die protrusions 120 can have sufficient flexibility, such that the die protrusions 120 can compress, stretch, bend, and/or deform in response to applied force. In at least one implementation, the die protrusions 120 can flex and/or compress when a manufacturer presses the flexible die 110 and the thermoplastic resin sheet 112 together.

The flexible die 110 can comprise a suitable thermoset material. In at least one implementation, the flexible die 110 can comprise a platinum-cured silicone. Alternatively, in one or more implementations, the flexible die 110 can comprise other suitable silicone or a suitable thermosetting elastomeric material. For instance, in one or more implementations, the flexible die 110 can comprise a cured synthetic rubber or other suitable material. In any event, the flexible die 110 can comprise a flexible material that is capable of withstanding temperatures between 180 and 450 degrees Fahrenheit and multiple temperature cycles without fatigue or plastic deformation.

In one or more implementations, the flexible die 110 can be substantially uniform and comprise a single material. In alternative implementations, the flexible die 110 can comprise a non-uniform structure, including more than one material. For example, the flexible die 110 can have one or more die protrusions 120 made from one type of thermoset, while the rest of the flexible die 110 can comprise a different type of thermoset or material.

In still further implementations, the flexible die 110 can comprise non-flexible and/or substantially rigid material. For example, a portion (e.g., the back portion) of the flexible die 110 can include a rigid material, such as a rigid polymer, glass, wood, aluminum, or steel. A flexible material, such as those described hereinabove, can be molded about such rigid segments, which can provide additional support to the flexible die 110. Thus, in one or more implementations, the flexible die 110 can include a flexible portion (made from silicone or other suitable material) and a rigid portion (made from a rigid polymer, glass, wood, steel, aluminum, or other suitable material).

In one or more implementations, the flexible die 110 can include a substantially rigid plate or substrate that provides support to the flexible die 110. For example, a back surface 114 of the flexible die 110 can comprise a rigid plate. Alternatively, a rigid insert can be overmolded, such as to form or to reinforce the back surface 114.

The die protrusions 120 can have various shapes. For example, in one or more implementations, the die protrusions 120 can have regular geometric shapes, such as rectangular or cuboid prisms, semi-cylinders, hemispheres, or other regular geometric shapes. Additionally or alternatively, the die protrusions 120 can have irregular shapes or can have various regular shapes combined to form a single or multiple die protrusions 120. Furthermore, in one or more implementations the flexible die 110 can include undercut protrusions 120a. Undercut protrusions 120a can allow for the creation of undercut recesses in a panel as explained in greater detail below.

The flexible die 110 also can include die protrusions 120b that have only a single surface 122. For example, die protrusions 120b can be hemispherical or semi-cylindrical, such that they have only one surface. Alternatively, die protrusions 120 also can have multiple surfaces. For instance, the flexible die 110 can include die protrusions 120 that have rectangular prismoid shapes. Such die protrusions 120 can have three or more surfaces. One or more protrusions can include distal surfaces 122 and surfaces 124 that form sidewalls. Such sidewalls 124 can have a curvature or various shapes thereon. Alternatively, the die protrusions 120 can have sidewalls 124 that are substantially flat, such as the sidewalls described above in connection with prismoid die protrusions 120.

Furthermore, die protrusions 120 can include sidewalls 124 that are substantially perpendicular to the back surface 114 and/or front surface 116 of the flexible die 110. Alternatively, the die protrusions 120 can include sidewalls 124 disposed at an angle with respect to the back surface 114 and/or front surface 116. For example, sidewalls can form an obtuse angle with respect to a portion of the back surface 114 and/or front surface 116, such as 92° angle—in other words, the sidewall can have a 2° draft angle with respect to the direction of force on or movement of the flexible die 110. In one or more implementations, the sidewalls can form an acute angle with respect to a portion of a back surface 114 and/or front surface 116, such as to form an undercutting die protrusion 120*a*. The sidewalls also can have angles greater or less than the angles described above.

In at least one implementation, the flexible die 110 can include die protrusions 120 that have varying shapes across the flexible die 110. Alternatively, all of the die protrusions 120 on the flexible die 110 can have the same, substantially the same, or similar shapes. For instance, all of the die protrusions 120 on the flexible die 110 can have a substantially rectangular prismoid shape.

Furthermore, the die protrusions 120 can correspond with a design or pattern of recesses that the manufacturer desires to create on the thermoplastic resin sheet 112. Hence, the flexible die 110 can include the die protrusions 120 that have non-geometric shapes, such as stylized relief (i.e., topography) of an object or an animal. For example, one or more of the die protrusions 120 can have a relief of a leaf or a fish. Additionally, die protrusions 120 can form a pattern of recesses that can appear as text or other stylized recesses or embossments on a surface of the decorative thermoplastic panel.

As shown by FIG. 1, the protrusions 120 have a height 126 (or in other words extend a distance 126 from the front surface 116). The height 126 can be based on a gauge or thickness of a panel 112 in which recesses are to be formed. In one or more implementations, the height 126 can range from 0.1 mm to 25 mm, 0.5 mm to 15 mm, 1 mm to 15 mm, and 2 mm to 10 mm. Additionally, the flexible die 110 can include die protrusion 120 that have heights 126 of less than 0.1 mm (112 µm), as described in more detail below in connection with various texture patterns and surface roughness. In at least one implementation, the protrusions 120 of the flexible die 110 can have uniform heights 126. The die protrusions 120 of the flexible die 110 alternatively can vary in height from protrusion to protrusion or even along the same protrusion 120.

Optionally, the flexible die 110 also can have one or more recessed die portions 130, which can recess into the front surface 116. The recessed die portions 130 can be adjacent to the die protrusions 120. In at least one implementation, the flexible die 110 can include recessed die portions 130 that are coplanar, such that the bottom surfaces 132 of the recessed die portions 130 are disposed in the same plane with respect to the back surface 114 and/or front surface 116 of the flexible die 110. The flexible die 110 also can include various recessed die portions 130 that are non-coplanar, such that the bottom surfaces 132 are disposed along more than one plane with respect to the back surface 114 and/or front surface 116.

Similar to the die protrusions 120, the recessed die portions 130 can have various shapes. For example, in at least one implementation, the recessed die portions 130 can have regular geometric shapes, such as rectangular or cuboid prisms, semi-cylinders, hemispheres, or other regular geometric shapes. Additionally or alternatively, the recessed die portions 130 can have irregular shapes.

The surfaces 122, 124 of the die protrusions 120 and the surfaces 132 of the die recessed portions 130 can have texture or texture patterns. As used herein, the term "texture" refers to a surface roughness. For example, a substantially smooth surface can have a surface roughness $R_a$ of about 0.8 µm or less (e.g., 0.2 µm, 0.1 µm, 0.05 µm, etc.). By contrast, a substantially rough surface can have surface roughness $R_a$ of about 1.2 µm or greater. The term "texture pattern" refers to alternating two or more textures on a surface, creating a visible pattern. For example, alternating texture on a surface can appear as stripes, circles, or other shapes or figures. For instance, the texture pattern can appear as a wood texture pattern.

The surfaces 122, 124 and/or 132 can have various textures and texture patterns. For instance, surfaces 122, 124 can have a first texture (e.g., $R_a$ of about 25 µm), while the surfaces 132 can have a second texture (e.g., $R_a$ of about 0.5 µm). Similarly, the surfaces 122, 124 can have a first texture pattern, while the surfaces 132 can have a second texture pattern. Furthermore, any portion of any surface 122, 124 and 132 can have a different texture and/or texture pattern from any other portion of the surfaces 122, 124, 132.

In addition the front surface 116 of the flexible die 110 can have a texture or texture pattern. As shown by FIG. 1, in one or more implementations the texture of the front surface 116 can differ from the texture of the die protrusions 120. Specifically, the texture of the die protrusions 120 can be rougher than the texture of the front surface 116. In alternative implementations, the texture of the front surface 116 can be rougher than the texture of the die protrusions 120. In still further implementations, the texture of the die protrusions 120 and the front surface can have the same roughness, but a different pattern. In yet additional implementations, the texture of the die protrusions 120 and the front surface 116 can have differing texture patterns.

Figure 2:
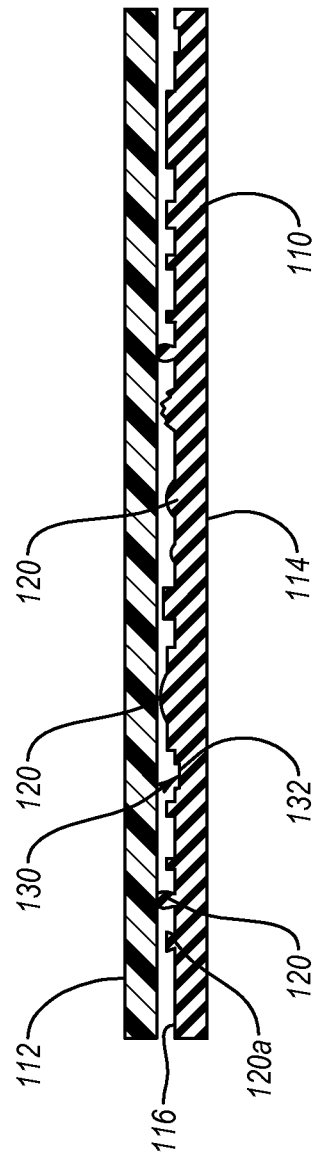
FIG. 2 illustrates a cross-sectional view of the flexible die and the thermoplastic resin sheet of FIG. 1 taken alone the line 2-2 of FIG. 1, albeit that the flexible die and the thermoplastic resin sheet are in contact with each other.

As illustrated in FIG. 2, the manufacturer can create a panel assembly by placing the thermoplastic resin sheet 112 and the flexible die 110 in contact with one another. In at least one implementation, the manufacturer can align the flexible die 110 with the thermoplastic resin sheet thermoplastic resin sheet 112, such that at least one edge of the flexible die 110 coincides with at least one edge of the thermoplastic resin sheet 112. Moreover, the flexible die 110 can have such dimensions as to cover the entire thermoplastic resin sheet thermoplastic resin sheet 112. Alternatively, the flexible die 110 can have a size and/or an area that is smaller than a size or an area of the thermoplastic resin sheet 112. Similarly, the manufacturer can position the flexible die flexible die 110 and/or the thermoplastic resin sheet 112 such that no edge of the flexible die 110 aligns with any edge of the thermoplastic resin sheet 112.

Figure 3:
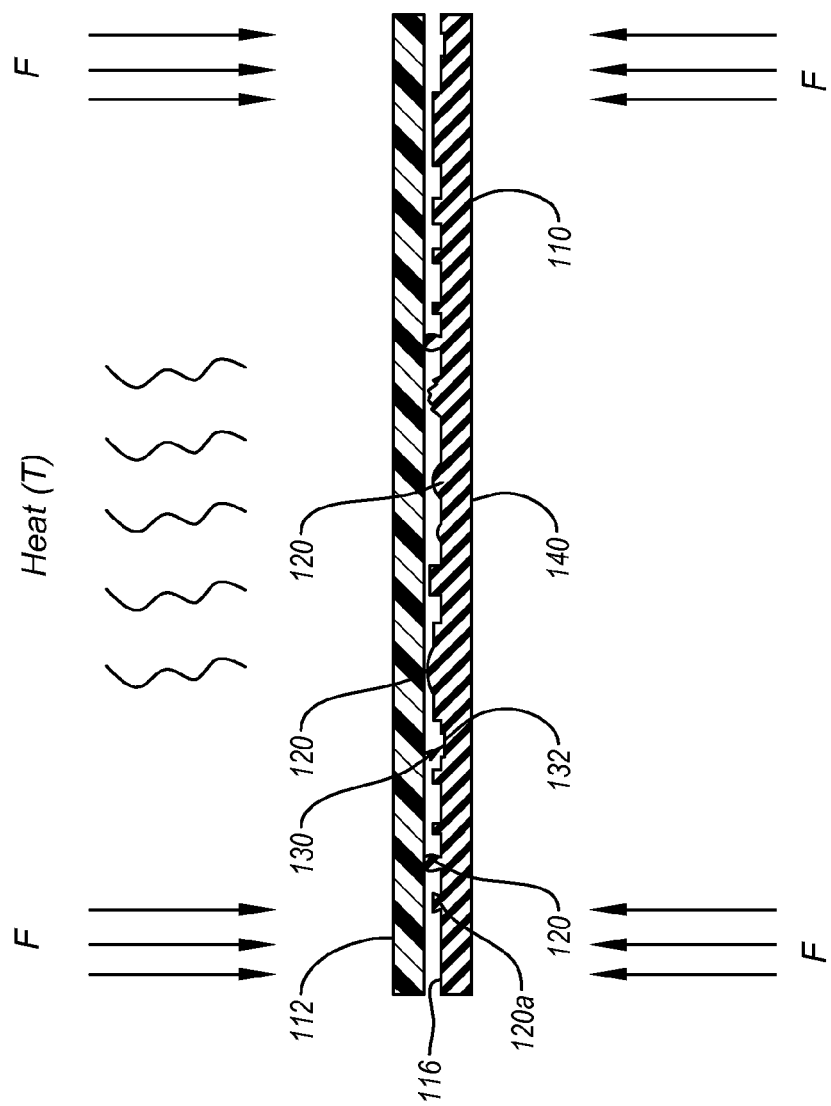
FIG. 3 illustrates a cross-sectional view of the flexible die and the thermoplastic resin sheet similar to FIG. 2, albeit with heat and pressure acting on the thermoplastic resin sheet in accordance with an implementation of the present invention.

In at least one implementation, as illustrated in FIG. 3, the manufacturer can apply heat T and pressure F to the flexible die 110 and the thermoplastic resin sheet 112. As shown by FIG. 3, upon the application of pressure between the flexible die 110 and the thermoplastic resin sheet 112, one or more of the flexible protrusions 120 can compress or otherwise deform from a natural configuration to a deformed configuration. Alternatively, the flexible protrusions 120 can remain in a natural configuration despite being pressed against the front surface 116 of the thermoplastic resin sheet 112.

As described above, the manufacturer can apply heat after pressing the flexible die 110 and the thermoplastic resin sheet 112 together, since the flexible and deformable characteristics of the flexible die 110 can prevent damage to the thermoplastic resin sheet 112. For instance, in lieu of cracking or chipping the thermoplastic resin sheet 112, the die protrusions 120, which press against a surface of the thermoplastic resin sheet 112, can deform to absorb the force applied to the flexible die 110 and thermoplastic resin sheet 112.

Alternatively, the manufacturer can preheat the thermoplastic resin sheet 112 and/or flexible die 110 before pressing the thermoplastic resin sheet 112 and the flexible die 110. As described above, however, foregoing preheating of the thermoplastic resin sheet 112 can reduce the total time required to produce the final decorative thermoplastic panel, which can also reduce the cost associated with such production. Furthermore, reduced production time also can lead to increased total production and shorter lead times.

In any event, once the manufacturer has prepared the panel assembly, the manufacturer can heat and press the flexible mold 110 and thermoplastic resin sheet 112 together. Applying heat and pressure can comprise the use of a heated mechanical press or the use of an autoclave. Heating for mechanical presses can be achieved with, but not limited to, hot steam, electric heat, hot oil heated and other methods. One will appreciate that the temperatures and pressures for processing the panel assembly with a heated mechanical press are dependent on the material type and thickness of the thermoplastic resin sheet 112.

For example, in one or more implementations, a temperature of between about 180° F. and about 450° F. is utilized. Similarly, in one or more implementations, the manufacturer can implement a processing pressure that is between approximately 5 pounds per square inch (psi) and approximately 250 psi, and preferably between about 5 psi and about 150 psi. The panel assembly is held at the appropriate maximum temperature and pressure for a period of time of about 0.1 to about 90 minutes. Further, the optimal temperature for embossing may vary depending on the thickness of the materials and the type of materials being processed.

In at least one implementation, the manufacturer can heat the flexible die 110 and/or the thermoplastic resin sheet 112 to approximately 240° F. For instance, the manufacturer can apply heat to the thermoplastic resin sheet thermoplastic resin sheet 112, thereby raising the temperature of the thermoplastic resin sheet 112 to 240° F. At the same time, the manufacturer may choose not to apply heat directly to the flexible die 110, such that the flexible die 110 remains at ambient temperature, at least until the flexible die 110 contacts the thermoplastic resin sheet 112.

The manufacturer also can heat the flexible die 110 and/or the thermoplastic resin sheet 112 to a temperature in one or more of the following ranges: 180° F. to 240° F.; 200° F. to 280° F.; and 220° F. to 450° F. Additionally, in at least one implementation, the manufacturer can heat the thermoplastic resin sheet 112 and/or the flexible die 110 to a temperature greater or less than the temperatures in the above ranges. This operation can be performed either with or without a vacuum press. For example in one implementation, the manufacturer can place the panel assembly in a vacuum bag. The manufacturer can then place the vacuum bag into a vacuum press or autoclave and apply the desired heat and pressure.

Figure 4:
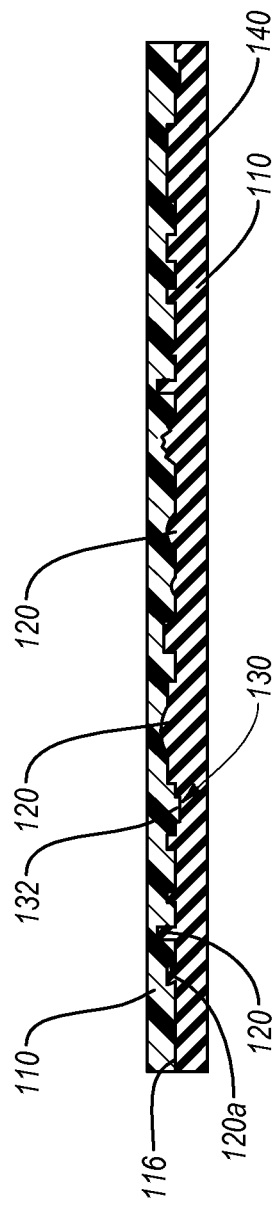
FIG. 4 illustrates a cross-sectional view of the flexible die and the thermoplastic resin sheet similar to FIG. 2, albeit with the flexible protrusions of the flexible die pressed into the thermoplastic resin sheet in accordance with an implementation of the present invention.

In one or more implementations, as the material of the thermoplastic resin sheet 112 approaches a glass transition temperature $T_g$, the material will begin to soften and the die protrusions 120 can extend into the front surface 116 of the thermoplastic resin sheet 112, forming corresponding recesses therein, as illustrated in FIG. 4. In particular, the resin material of the thermoplastic resin sheet 112 can flow about the flexible protrusions 120. Thus, once the resin is sufficiently heated, the flexible protrusions 120 can move from a deformed configuration to the natural configuration, thereby displacing resin of the thermoplastic resin sheet 112.

For example, as described above, the flexible die 110 can have undercutting die protrusions 120a. When the flexible die 110 presses against the thermoplastic resin sheet 112 and heat is applied, the thermoplastic material of the thermoplastic resin sheet 112 can flow about the die protrusions 120. For instance, the resin can flow along the walls of the die protrusion 120a, thereby encasing the die protrusion 120a within the thermoplastic resin sheet 112.

Once the die protrusions 120 have extended to a desired position within the thermoplastic resin sheet 112, the manufacturer can remove the pressure and/or heat from the thermoplastic resin sheet 112 and/or flexible die 110. The panel can cool by being held rigid at a temperature of about 50° F. to about 120° F. and a pressure of about 1 to about 120 psi until it cools below the glass transition temperature of the resin material. Moreover, the manufacturer can manually or automatically remove the flexible die 110 from the thermoplastic resin sheet 112 to create a finished decorative thermoplastic resin panel 200 (illustrated in FIG. 5).

In one or more implementations, the manufacturer can separate the flexible die 110 from the thermoplastic resin sheet 112 once the thermoplastic resin sheet 112 has cooled below its glass transition temperature. As the die protrusions 120 are separated from corresponding recesses 220 (see FIG. 5), the die protrusions 120 can flex or otherwise deform. The ability of the die protrusions 120 to flex and/or deform can help ensure that the recesses 220 are not damaged upon separation from the flexible die 110. For example, the undercutting die protrusion 120a can flex and/or deform to come out of a recess created in the thermoplastic resin sheet 112 to leave an undercut recess 220a.

Figure 5:
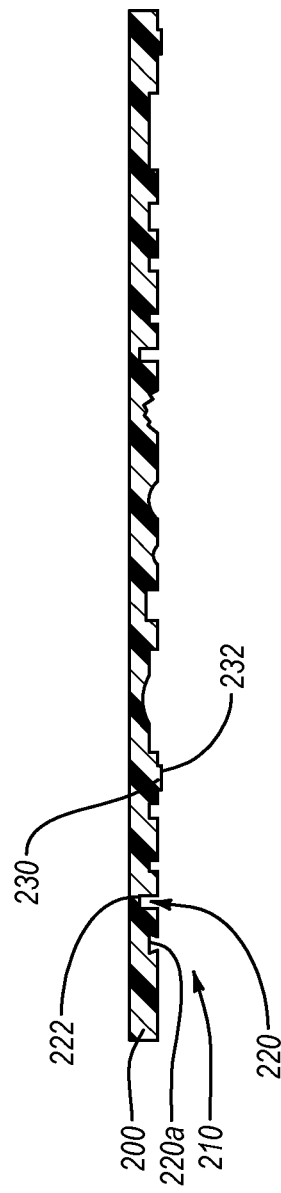
FIG. 5 illustrates a cross-sectional view of a thermoplastic panel with decorative recesses in accordance with an implementation of the present invention.

As illustrated in FIG. 5, the finished decorative thermoplastic resin panel 200 can include one or more recessed portions 220, which can correspond (i.e., can have the same or substantially the same shape, texture, and/or texture pattern) with the die protrusions 120 of the flexible die 110. The recessed portions 220 can extend into a front surface of the thermoplastic resin panel 200. Each of the recessed portions 220 can have a one or more recessed surfaces recessed surfaces 222 that can correspond with the surfaces 122 of the die protrusions 120. Furthermore, the recessed surfaces 222 can have a texture or texture pattern that is a mirror image of the texture or texture pattern on the surfaces 122 of the die protrusions 120.

The decorative thermoplastic resin panel 200 also can have one or more protruding portions 230. The protruding portions 230 can extend from the front surface of the thermoplastic resin panel 200. In at least one implementation, the protruding portions 230 can correspond with the recessed die portions 130 of the flexible die 110. Similarly, the protruding portions 230 can have one or more protruding surfaces 232, which correspond with the surfaces 132 of the recessed die portions 130.

The protruding surfaces 232 can have a texture or texture pattern that is a mirror image of the texture or texture pattern on the surfaces 132 of the recessed die portions 130. Furthermore, as described above, the recessed surfaces 222 can have a different texture or texture pattern than the protruding surfaces 232. The recessed portions 220, protruding portions 230, and the corresponding textures and/or texture patterns can form a surface pattern 210 that can be a mirror image of the pattern of the die protrusions 120 and recessed die portions 130 on the flexible die 110.

Furthermore, the non-recessed and non-protruding portions of the thermoplastic resin panel 200 (i.e., the front surface) can have a texture or texture pattern that is a mirror image of the texture or texture pattern on the front surfaces 116 of the flexible die 110. Furthermore, as described above, the non-recessed and non-protruding portions can have a different texture or texture pattern than the recessed 222 and/or protruding surfaces 232.

Thus, the recesses 220 can have a first texture pattern and front surface of the thermoplastic resin panel 200 can have a second texture pattern that differs from the first texture pattern. For example, the first texture pattern can be rougher than the second texture pattern. Additionally, or alternatively, the first texture pattern can cause more light diffusion than the second texture pattern. Thus, one or more of the front surface and recesses can have a texture that is a high gloss finish with high light transmittance, a non-glare finish with a smooth appearance, a durable finish with a subtle texture, a durable finish with a pebbled texture, a frosted matte finish with high light diffusion, or another texture. The difference between the texture patterns and/or surface roughness of the recessed and the front surface can enhance the aesthetic effect and/or distinctiveness of the recesses.

One will appreciate in light of the disclosure herein that the flexible die 110 can allow for the creation of recesses 220 with a great deal of versatility and variety. The recesses 220 shown herein have all included a texture that differs from the texture of the surface into which they extend. The present invention is not so limited. Thus, in one or more implementations the recesses 220 can have the same texture as the surface into which they extend.

Figure 6:
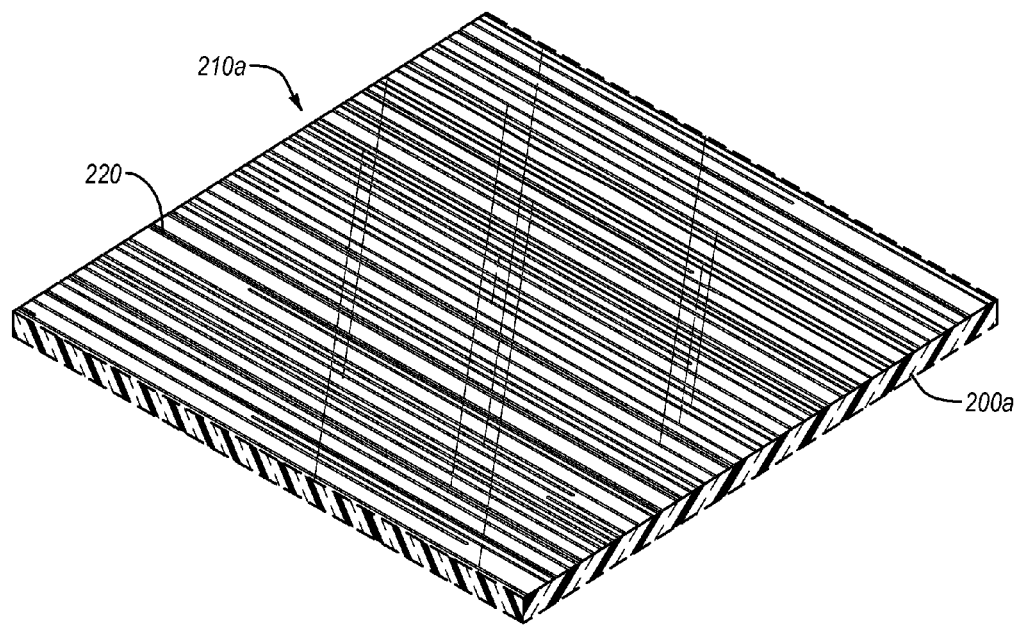
FIG. 6 illustrates a perspective view of a thermoplastic panel with decorative recesses in accordance with another implementation of the present invention.
Figure 7:
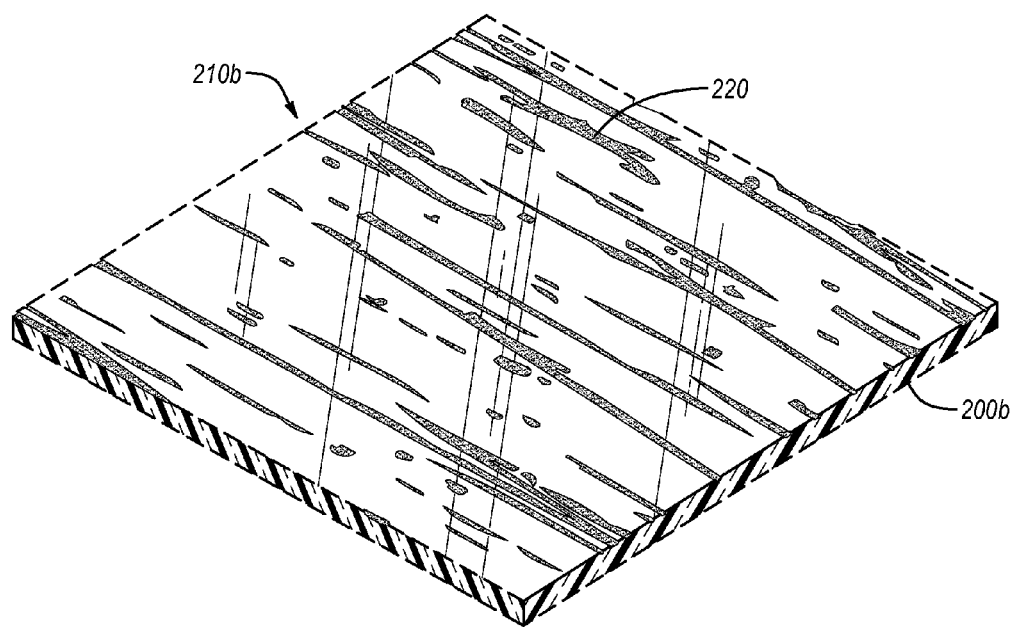
FIG. 7 illustrates a perspective view of a thermoplastic panel with decorative recesses in accordance with yet another implementation of the present invention.
Figure 8:
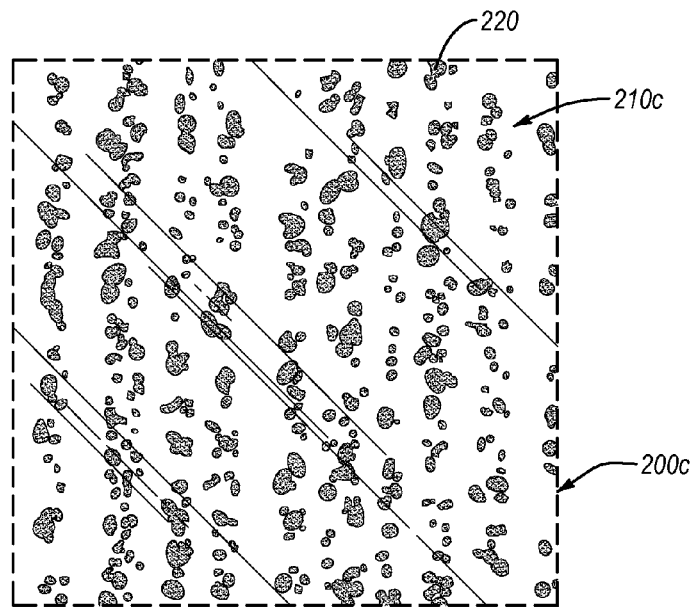
FIG. 8 illustrates a plan view of a thermoplastic panel with decorative recesses in accordance with still another implementation of the present invention.
Figure 9:
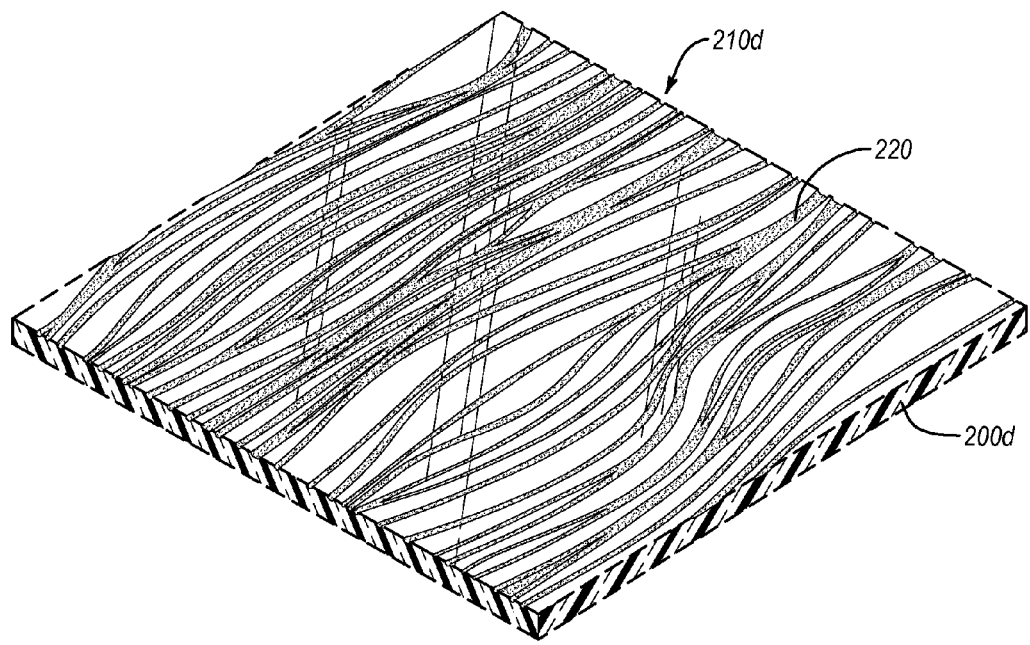
FIG. 9 illustrates a perspective view of another thermoplastic panel with decorative recesses in accordance with an implementation of the present invention.
Figure 10:
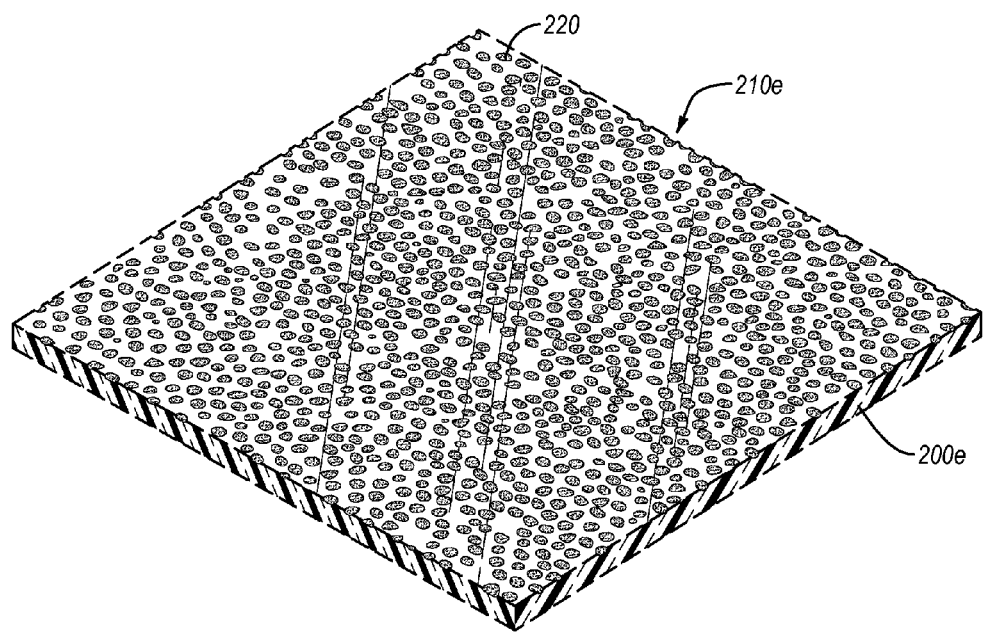
FIG. 10 illustrates a perspective view of an additional thermoplastic panel with decorative recesses in accordance with an implementation of the present invention.
Figure 11:
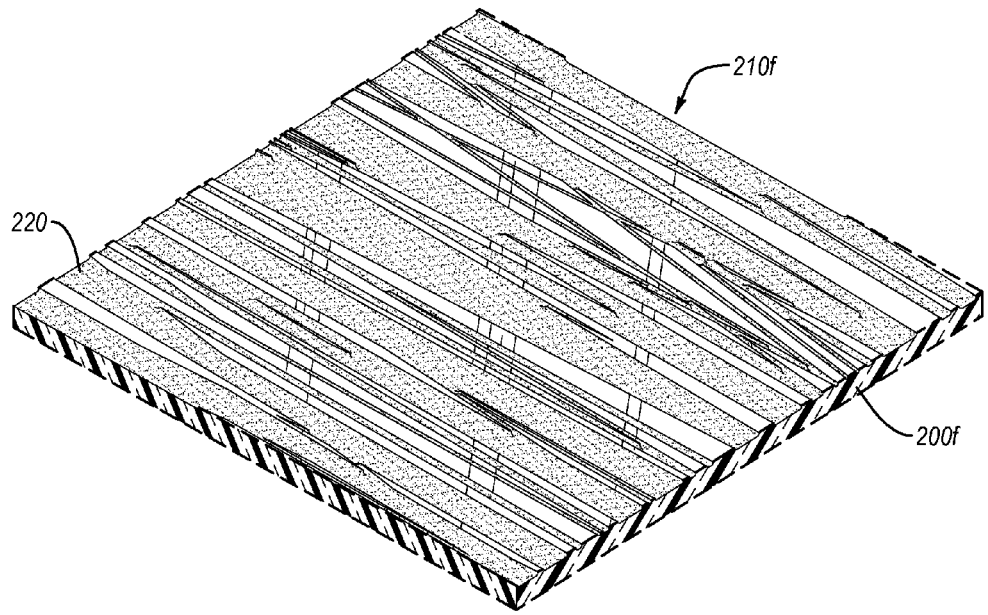
FIG. 11 illustrates a perspective view of still another thermoplastic panel with decorative recesses in accordance with an implementation of the present invention.

In any event, a manufacturer can create various recesses patterns on a surface of the decorative thermoplastic resin panel. FIGS. 6-11 illustrate some such surface patterns. For example, FIG. 6 illustrates a decorative thermoplastic resin panel 200a having a plurality of recesses 220 forming a straight surface pattern 220a. FIG. 7 illustrates a decorative thermoplastic resin panel 200b having a plurality of recesses 220 forming a meadow surface pattern 220b. FIG. 8 illustrates a decorative thermoplastic resin panel 200c having a plurality of recesses 220 forming a droplet-like surface pattern 220c. FIG. 9 illustrates a decorative thermoplastic resin panel 200d having a plurality of recesses 220 forming a flow surface pattern 220d. FIG. 10 illustrates a decorative thermoplastic resin panel 200e having a plurality of recesses 220 forming a spotted surface pattern 220e. FIG. 11 illustrates a decorative thermoplastic resin panel 200f having a plurality of recesses 220 forming a rule surface pattern 220f.

In addition to the various shapes and depths of recessed portions 220 of the surface patterns 210, the recessed portions 220 and/or the non-recessed portions 230 of the decorative thermoplastic resin panel 200 can have different textures and texture patterns. Consequently, in light of this disclosure, it should be appreciated by those skilled in the art that the manufacturer can form essentially limitless number of surface patterns 210 on the decorative thermoplastic resin panels 200.

The present invention may be embodied in other specific forms without departing from its spirit or essential characteristics. For example, the flexible dies can include flexible protrusions on both the front and back surfaces. Thus, a single flexible die can form recesses into surfaces of two different panels at the same time. Furthermore, the panels can include recesses in both the front and back surfaces. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method of making a decorative thermoplastic panel, comprising:
    preparing panel assembly comprising a thermoplastic resin sheet and a flexible die that has a plurality of flexible protrusions extending from a front surface;
    pressing the flexible die and the thermoplastic resin sheet together, such that one or more flexible protrusions of the plurality of flexible protrusions are in contact with a surface of the thermoplastic resin sheet; and
    applying heat to one or more of the flexible die and thermoplastic resin sheet to cause resin of the thermoplastic resin sheet to flow about the flexible protrusions thereby creating a plurality of recesses extending into the surface of the thermoplastic resin sheet;
    wherein pressing the flexible die and the thermoplastic resin sheet together comprises causing at least one flexible protrusion of the plurality of flexible protrusions to compress or otherwise deform from a natural configuration.

2. The method as recited in claim 1, wherein applying heat comprises applying heat after pressing the flexible die and the thermoplastic resin sheet together.

3. The method as recited in claim 2, wherein the at least one flexible protrusion of the plurality of flexible protrusion displaces resin of the thermoplastic resin sheet and returns to the natural configuration as the thermoplastic resin sheet is heated above a glass transition temperature of the thermoplastic resin sheet.

4. The method as recited in claim 1, wherein:
    at least one protrusion of the plurality of protrusions has a first texture;
    the at least one protrusion creates at least a first recess in the thermoplastic resin sheet; and
    the at least one protrusion transfers the first texture to the at least a first recess.

5. The method as recited in claim 4, wherein:
    the front surface of the flexible die has a second texture;
    the second texture differs from the first texture; and
    the front surface transfers the second texture to the surface of the thermoplastic resin sheet.

6. The method as recited in claim 4, wherein:
    at least a second protrusion of the plurality of protrusions has a third texture;
    the third texture differs from the first texture;
    the at least a second protrusion creates at least a second recess in the thermoplastic resin sheet; and
    the at least a second protrusion transfers the second texture to the at least a second recess.

7. The method as recited in claim 1, wherein the flexible die comprises a thermoset.

8. The method as recited in claim 7, wherein the flexible die comprises a platinum cured silicone.

9. The method as recited in claim 1, wherein applying heat comprises heating the thermoplastic resin sheet to a temperature between about 180° F. and about 450° F.

10. The method as recited in claim 1, further comprising positioning the panel assembly into a vacuum bag, wherein the panel assembly is heated and/or pressurized in a vacuum press or autoclave.

11. The method as recited in claim 1, further comprising positioning the panel assembly into a thermo press, wherein the panel assembly is heated and/or pressed in the thermo press.

12. A method of making a decorative thermoplastic panel, comprising:
- preparing panel assembly comprising a thermoplastic resin sheet and a flexible die that has a plurality of flexible protrusions extending from a front surface;
- pressing the flexible die and the thermoplastic resin sheet together, such that one or more flexible protrusions of the plurality of flexible protrusions are in contact with a surface of the thermoplastic resin sheet; and
- applying heat to one or more of the flexible die and thermoplastic resin sheet to cause resin of the thermoplastic resin sheet to flow about the flexible protrusions thereby creating a plurality of recesses extending into the surface of the thermoplastic resin sheet;

wherein:
- pressing the flexible die and the thermoplastic resin sheet together comprises causing at least one flexible protrusion of the plurality of flexible protrusions to compress or otherwise deform from a natural configuration; and
- the at least one flexible protrusion of the plurality of flexible protrusion displaces resin of the thermoplastic resin sheet and returns to the natural configuration as the thermoplastic resin sheet is heated above a glass transition temperature of the thermoplastic resin sheet.

13. The method as recited in claim 12, wherein applying heat comprises applying heat after pressing the flexible die and the thermoplastic resin sheet together.

14. The method as recited in claim 12, wherein:
- at least one protrusion of the plurality of protrusions has a first texture;
- the at least one protrusion creates at least a first recess in the thermoplastic resin sheet; and
- the at least one protrusion transfers the first texture to the at least a first recess.

15. The method as recited in claim 14, wherein:
- the front surface of the flexible die has a second texture;
- the second texture differs from the first texture; and
- the front surface transfers the second texture to the surface of the thermoplastic resin sheet.

16. The method as recited in claim 14, wherein:
- at least a second protrusion of the plurality of protrusions has a third texture;
- the third texture differs from the first texture;
- the at least a second protrusion creates at least a second recess in the thermoplastic resin sheet; and
- the at least a second protrusion transfers the second texture to the at least a second recess.

17. The method as recited in claim 12, wherein the flexible die comprises a thermoset.

18. The method as recited in claim 17, wherein the flexible die comprises a platinum cured silicone.

19. The method as recited in claim 12, wherein applying heat comprises heating the thermoplastic resin sheet to a temperature between about 180° F. and about 450° F.

20. The method as recited in claim 12, further comprising positioning the panel assembly into a vacuum bag, wherein the panel assembly is heated and/or pressurized in a vacuum press or autoclave.

21. The method as recited in claim 12, further comprising positioning the panel assembly into a thermo press, wherein the panel assembly is heated and/or pressed in the thermo press.

* * * * *